US012732421B2

(12) United States Patent
Reeves

(10) Patent No.: US 12,732,421 B2
(45) Date of Patent: Sep. 8, 2026

(54) SYSTEM AND APPLICATION FOR DYNAMIC CUSTOMER EXPERIENCE

(71) Applicant: T-Mobile USA, Inc., Bellevue, WA (US)

(72) Inventor: Raymond E. Reeves, Orlando, FL (US)

(73) Assignee: T-Mobile USA, Inc., Bellevue, WA (US)

( * ) Notice: Subject to any disclaimer, the term of this patent is extended or adjusted under 35 U.S.C. 154(b) by 124 days.

(21) Appl. No.: 18/785,300

(22) Filed: Jul. 26, 2024

(65) Prior Publication Data

US 2026/0032047 A1 Jan. 29, 2026

(51) Int. Cl.
*H04L 41/0813* (2022.01)

(52) U.S. Cl.
CPC ................................ *H04L 41/0813* (2013.01)

(58) Field of Classification Search
CPC .................................................. H04L 41/0813
USPC .......................................................... 709/221
See application file for complete search history.

(56) References Cited

U.S. PATENT DOCUMENTS

2020/0205114 A1* 6/2020 Elcock .................. H04W 60/04
2023/0373457 A1* 11/2023 Snyder .................. B60T 17/221
2025/0039659 A1* 1/2025 Wang ...................... H04W 8/20
2025/0106600 A1* 3/2025 Wright ............... H04B 7/18563

FOREIGN PATENT DOCUMENTS

EP 3657273 A1 * 5/2020 ......... G05B 19/0426

* cited by examiner

*Primary Examiner* — Zi Ye
(74) *Attorney, Agent, or Firm* — Lee & Hayes, P.C.

(57) ABSTRACT

A system to dynamically adjust operational settings on a user equipment or set of user equipment operating jointly based at least in part on current conditions associated with the user equipment and/or changes in conditions of the user equipment. In some cases, the system may generate operational modes that may be activated by the user or on behalf of the user based at least in part on device data associated with the user equipment collected over time.

20 Claims, 6 Drawing Sheets

SYSTEM AND APPLICATION FOR DYNAMIC CUSTOMER EXPERIENCE

BACKGROUND

Electronic devices, today, often offer a wide range of operational modes and settings available to a user. However, often the operational modes must be changed manually via a user interface and, accordingly, rely on the user to remember to take action. Additionally, the operational modes are pre-defined and may not be applicable for all users or situations they encounter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
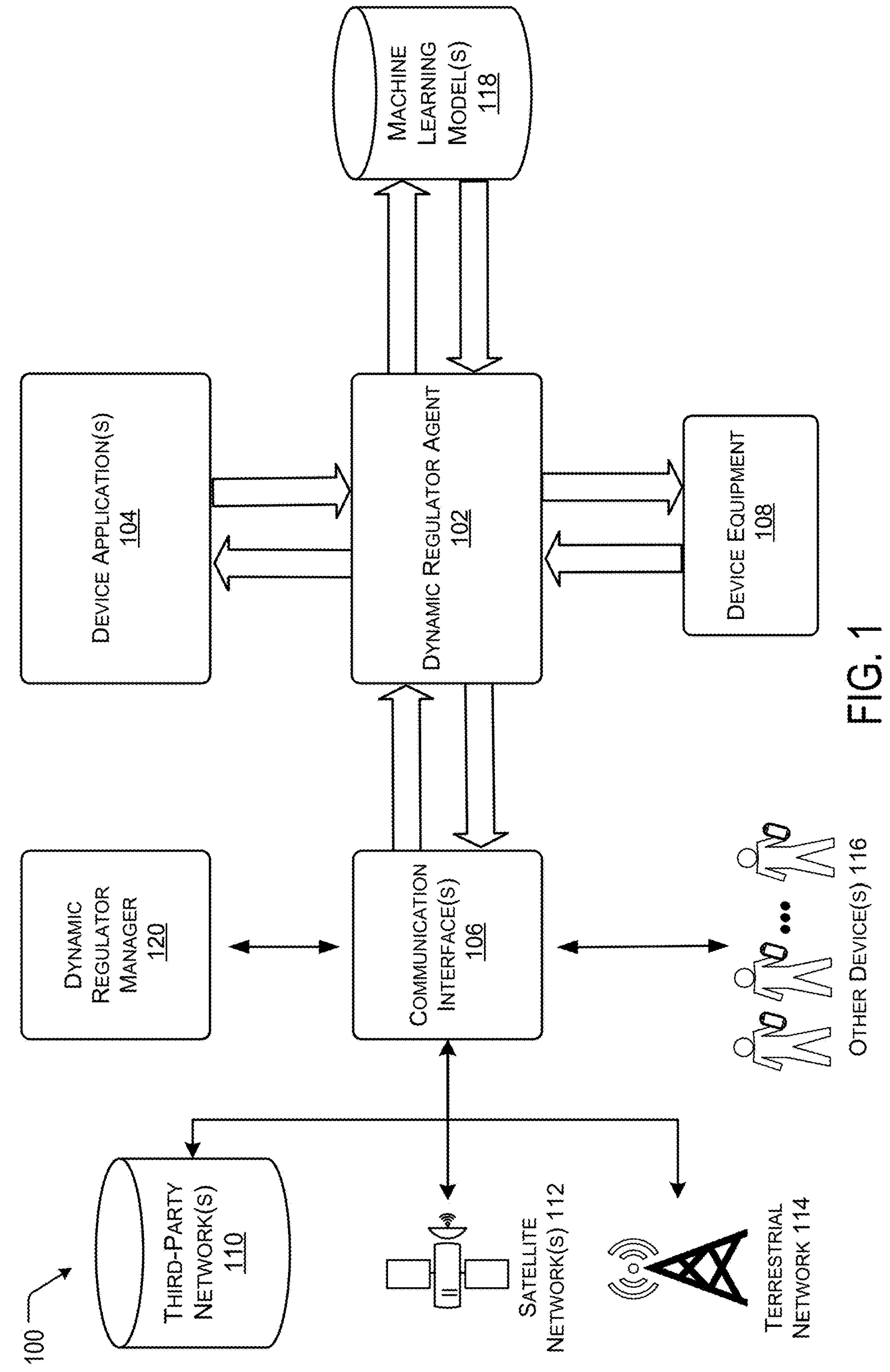
FIG. 1 is an example block diagram of a UE implementing a dynamic regulator agent according to some implementations.

Discussed herein are systems and applications for providing operational modes for electronic devices and user equipment (UE) that are customized to the user and a current situation or occurrence. For example, a dynamic regulator agent may be configured to provide dynamic operational modes and/or setting adjustments to a device on behalf of a user. In some cases, the dynamic regulator agent may allow a user to define settings and configurations associated with a standard mode that operates as a default mode of the device. In some cases, the dynamic regulator agent may determine and suggest recommendations to adjust the standard mode of the device based on device data, including but not limited to environmental data associated with a physical environment surrounding the user and the device (e.g., location, temperature, other proximate or connected UE, and the like), user interactions with the device, historical data (such as user behavioral data, user preferences, and the like), network data (e.g., available networks, connectivity, bandwidth, and the like), hardware data associated with components of the user equipment, and the like. For example, if the user regularly enables cellular calls when the device is within a specific geographic region, such as a region associated with the user's home, the dynamic regulator agent may recommend that the user accept a change to the standard mode to allow for cellular calling when the user is within the specific geographic region associated with the home of the user.

In some implementations, the dynamic regulator agent may utilize one or more machine learning models to generate the recommendations for the user and the device based on historical device data collected over time and interactions between the user and applications hosted on the device and/or former UE. The one or more machine learning models may be trained on user interaction data as well as other device data, such as environmental data, a combination thereof as well as other data to generate operational modes and/or adjust settings of the device. In some cases, the one or more machine learning models may generate recommendations based on device characteristics and/or capabilities, such as battery life, processors, display, and the like. In some specific examples, the one or more machine learning models may be trained using third-party data associated with occurrences of third-party user acceptance/rejection of recommendations.

In some examples, in addition to allowing a user to define a standard mode and providing recommendations to update the standard operational mode, the dynamic regulator agent may be configured to generate additional operational modes and/or settings based on the device data. For example, in some cases, rather than recommending a change to the standard mode, the dynamic regulator agent may generate a new operational mode, such as an at home operational mode in the example above. In this example, the at home operational mode may be enabled on the device by the dynamic regulator agent, when the dynamic regulator agent detects the user entered the specific geographic area associated with the home of the user. In this manner, the user may maintain a standard mode that enables cellular calling and disables Wi-Fi calling as the default but engages the at home mode on behalf of the user in response to the device entering the user's home.

In some implementations, the dynamic regulator agent may utilize one or more machine learning models to generate the operational modes customized for the user and the device based on historical device data collected over time and interactions between the user and applications hosted on the device and/or former UE. The one or more machine learning models may be trained on user interaction data as well as other device data, such as environmental data, a combination thereof as well as other data to generate operational modes and/or adjust settings of the device. In some cases, the one or more machine learning models may generate operational modes and/or settings based on device characteristics and/or capabilities, such as battery life, processors, display, and the like.

As an illustrative example, the dynamic regulator agent may determine behavioral patterns of the user based on reoccurring or regular interactions with the device. For example, if the user regularly sets an alarm at 6:00 am each morning during the week (such as Monday through Friday), the dynamic regulator agent may determine or define a weekday wake up mode that sets the alarm for the user for each weekday morning at 6:00 am. In some cases, the dynamic regulator agent may also utilize calendar data, email data, appointment data, and/or the like as an input to the one or more machine learning models that are updating the operational modes including the weekday wake up mode. In these cases, the dynamic regulator agent may adjust the alarm time based on calendar data and scheduled events, such as days off, holidays, early morning meetings, international meetings, and the like. In this manner, the dynamic regulator agent may generate an operational mode on behalf of the user that is customized for the user interactions while applying flexibility to change or update the operational mode settings to accommodate fluctuations in the user interactions (e.g., variations from the regular occurrences).

In some implementations, the dynamic regulator agent may select from existing operational modes and/or settings based on current device data, such as selecting the at home mode when the location data indicates the user is at home. In this implementation, the dynamic regulator agent may utilize one or more machine learning models to select between operational modes and/or device settings based on the current device data. For example, the dynamic regulator agent may input device connectivity data (such as available networks, location data, and the like) into the one or more machine learning models and receive a selection of the operational mode as an output. As one example, the dynamic regulator agent and/or the machine learning models may determine the availability of a airplanes Wi-Fi network. In these example, the dynamic regulator agent may determine the user is onboard an airplane and adjust the operational mode to an airplane mode on behalf of the user.

In other cases, the dynamic regulator agent may utilize current device data including location data to determine (e.g., generate, select, and update) operational modes and settings on a regular basis for the user. For example, if the user enters a physical location with little or no terrestrial cellular or Wi-Fi service, the dynamic regulator agent may generate a satellite connectivity mode that reduces the power consumption of the device, limits cellular service, reduces network pings or device updates (e.g., clock synchronization, receipt of text messages, application downloads, such as email downloads, and the like).

In one specific example, if the user is in a location that has limited or no terrestrial cellular or Wi-Fi service but the device is in proximity to one or more other local UE, each device hosting a dynamic regulator agent may synchronize or generate a joint operational mode between the UE. For example, the dynamic regulator agent of each device may determine an operational mode between UE that allows for short range wireless communication between UE and assigns, such as on a periodic basis (e.g., round robin type assignments), a priority basis (e.g., largest remaining battery life, most efficient hardware for specific tasks, and the like), or other basis, operational tasks for the group of proximate UE. As an illustrative example, the device having the largest remaining battery life may be assigned to perform check-ins with a satellite network for all of the UE in the group and relay any network updates to the proximate UE via a short range wireless network. In some cases, the dynamic regulator agent may cause the UE to synchronize a schedule, such that the short range wireless capabilities may be turned on and/or off concurrently in order to receive network updates via the relay or the like.

In the various examples, the user may define the operational modes and/or conditions upon which the dynamic regulator agent may alter operational modes, switch operational modes, or the like. In some cases, the user may define security settings, such as defining under what conditions the dynamic regulator agent may interface (e.g., connect, share data, perform tasks for or have task performed by, or the like) with other dynamic regulator agents on third-party UE or the like. For example, the user may restrict the dynamic regulator agent to interface only with UE or users placed on an approved or authorized list.

In some cases, each of the UE hosting a dynamic regulator agent may be in communication with one or more dynamic regulator manager. For example, the dynamic regulator manager may be a cloud-based service that assists the local dynamic regulator agents on the UE to coordinate joint operation modes (improve local performance, provide system preferences, assign local groups or hives, determine proximity, and the like), train machine learning models, and the like. In some cases, the dynamic regulator manager may also interface with various third-party systems (e.g., government systems, network systems, corporate systems, and the like) on behalf of each of the UE.

In some cases, the dynamic regulator agent may allow for the user to define one or more operational modes. For example, the user may select one or more settings and/or device characteristics or capabilities that should be activated or enforced when a mode is indicated. In some cases, the user may also define one or more conditions upon which the user defined mode may initiate or activate. As one illustrative example, the dynamic regulator agent may allow the user to generate the user defined modes with the assistance of one or more machine learning models.

For instance, the user may designate via an interface on the UE one or more conditions, device settings, device characteristics, and the like that may be input into the one or more machine learning models, such as via the dynamic regulator agent, and the dynamic regulator agent may receive an initial mode as the output of the one or more machine learning models. In some implementations, the dynamic regulator agent may also present the newly output mode to the user via a user interface of the UE hosting the dynamic regulator agent, such that the user may utilize the user interface to adjust or refine the conditions, settings, characteristics, and/or capabilities for use when the mode is active or upon which the mode should be enacted on behalf of the user by the UE.

As described herein, the machine learning models may be generated using various machine learning techniques. For example, the models may be generated using one or more neural network(s). A neural network may be a biologically inspired algorithm or technique which passes input data through a series of connected layers to produce an output or learned inference. Each layer in a neural network can also comprise another neural network or can comprise any number of layers (whether convolutional or not). As can be understood in the context of this disclosure, a neural network can utilize machine learning, which can refer to a broad class of such techniques in which an output is generated based on learned parameters.

As an illustrative example, one or more neural network(s) may generate any number of learned inferences or heads from the captured sensor and/or image data. In some cases, the neural network may be a trained network architecture that is end-to-end. In one example, the machine learned models may include segmenting and/or classifying extracted deep convolutional features of the sensor and/or image data into semantic data. In some cases, appropriate truth outputs of the model in the form of semantic per-pixel classifications (e.g., vehicle identifier, container identifier, driver identifier, and the like).

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like. In some cases, the system may also apply Gaussian blurs, Bayes Functions, color analyzing or processing techniques and/or a combination thereof.

FIG. 1 is an example block diagram 100 of a UE implementing a dynamic regulator agent 102 according to some implementations. In the current example, the dynamic regulator agent 102 may be configured to interface with one or more other device applications 104, including but not limited to, an operating system of the UE. In this manner, the dynamic regulator agent 102 may be able to activate and deactivate operational modes of the UE on behalf of the user, as discussed herein.

The dynamic regulator agent 102 may also be communicatively coupled one or more communication interfaces 106 (e.g., one or more wireless communication interfaces, wired communication interfaces, and/or the like) and/or other device equipment 108 (e.g., device hardware, device sensors, user interfaces, user input devices, displays, speakers, microphones, and/or the like). For example, the dynamic regulator agent 102 may receive sensor data (e.g., location, environmental data, such as brightness, user data, such as active user biometric data, activity data, such as gyroscope data, accelerator data, or the like, and/or the like), user input data, audio data, and the like. The dynamic regulator agent 102 may also receive network data from various networks via the communication interfaces 106, such as data from third party systems 110, satellite networks 112, terrestrial networks 114, and the like. The dynamic regulator agent 102 may also receive data from other devices 116 that are proximate to the UE via the communication interfaces (such as via short range wireless communication protocols).

The dynamic regulator agent 102 may also be communicatively coupled to one or more machine learning models 118. For instance, the dynamic regulator agent 102 may input data received from the device applications 104, the device equipment 108, the communication interfaces 106 (e.g., data from one or more networks 110-114 and/or the other devices 116) into the one or more machine learning models 118 and the one or more machine learning models 118 may output a selection of an operational mode that the dynamic regulator agent 102 may apply to the UE.

As discussed herein, the one or more machine learning models 118 may also receive data from the device applications 104, the device equipment 108, the communication interfaces 106 (e.g., data from one or more networks 110-114 and/or the other devices 116) and the like as an input in order to generate one or more dynamic operational modes on behalf of the user. In some cases, the input data may be processed by the dynamic regulator agent 102 prior to inputting into the one or more machine learning models 118. For example, the dynamic regulator agent 102 may curate related data over a period of time, detect patterns in user behavior (e.g., similar behavior each day, day of the week, month, or the like) and input the curated data into the one or more machine learning models 118 in order to receive as an output the dynamic operational mode. In some specific examples, the dynamic regulator agent 102 may utilize one or more of the machine learning models 118 to assist in curating the data received overtime, such as to detect user behavioral patterns, related data or correspondences between data, and the like.

In the illustrated example, the dynamic regulator agent 102 may be in communication with a cloud-based dynamic regulator manager 120. In these examples, the dynamic regulator manager 120 may be configured to assist the dynamic regulator agent 102 in generating and/or selecting modes for the UE. For example, the dynamic regulator agent 102 may provide data related to the user interactions with the UE, the environment surrounding the UE, the other devices in proximity or close range wireless communication with the UE, device application data, and/or the like to the cloud-based dynamic regulator manager 120 at various intervals. In some cases, the cloud-based dynamic regulator manager 120 may also receive operational modes and/or data associated with active operational modes or changes in operational modes upon the UE. In this manner, the cloud-based dynamic regulator manager 120 may utilizes additional processing resources and/or additional machine learning models to generate and/or select the operational modes for the UE.

In some instances, the cloud-based dynamic regulator manager 120 may also utilize third-party data (e.g., operational mode data, device data, and the like) associated with other UEs and devices hosting dynamic regulator agents to assist in generating and selecting operational modes for the UE hosting the dynamic regulator agent 102. For example, the cloud-based dynamic regulator manager 120 may determine similar users or similar devices to the UE and utilize operational mode data, user behavioral data, and device data associated with the other similar devices to generate and select operational modes for the UE hosting the dynamic regulator agent 102.

In some implementations, the cloud-based dynamic regulator manager 120 may receive an operational mode request and permissions for joint operational modes between other devices 116 in proximity to the UE. In this manner, the cloud-based dynamic regulator manager 120 may generate, select, and cause a joint operational mode to be applied by the dynamic regulator agent 102 and other proximate devices 116, such as to share network connectivity responsibilities (e.g., wireless network requests, clock synchronization, network pings, location updates, and/or the like). In some cases, the cloud-based dynamic regulator manager 120 may manage the joint operational mode requests and/or grouping of the individual UEs and devices that are assembled to form a group operating under a joint or shared operational mode as well as to assign tasks to different UEs and devices of the group.

Figure 2:
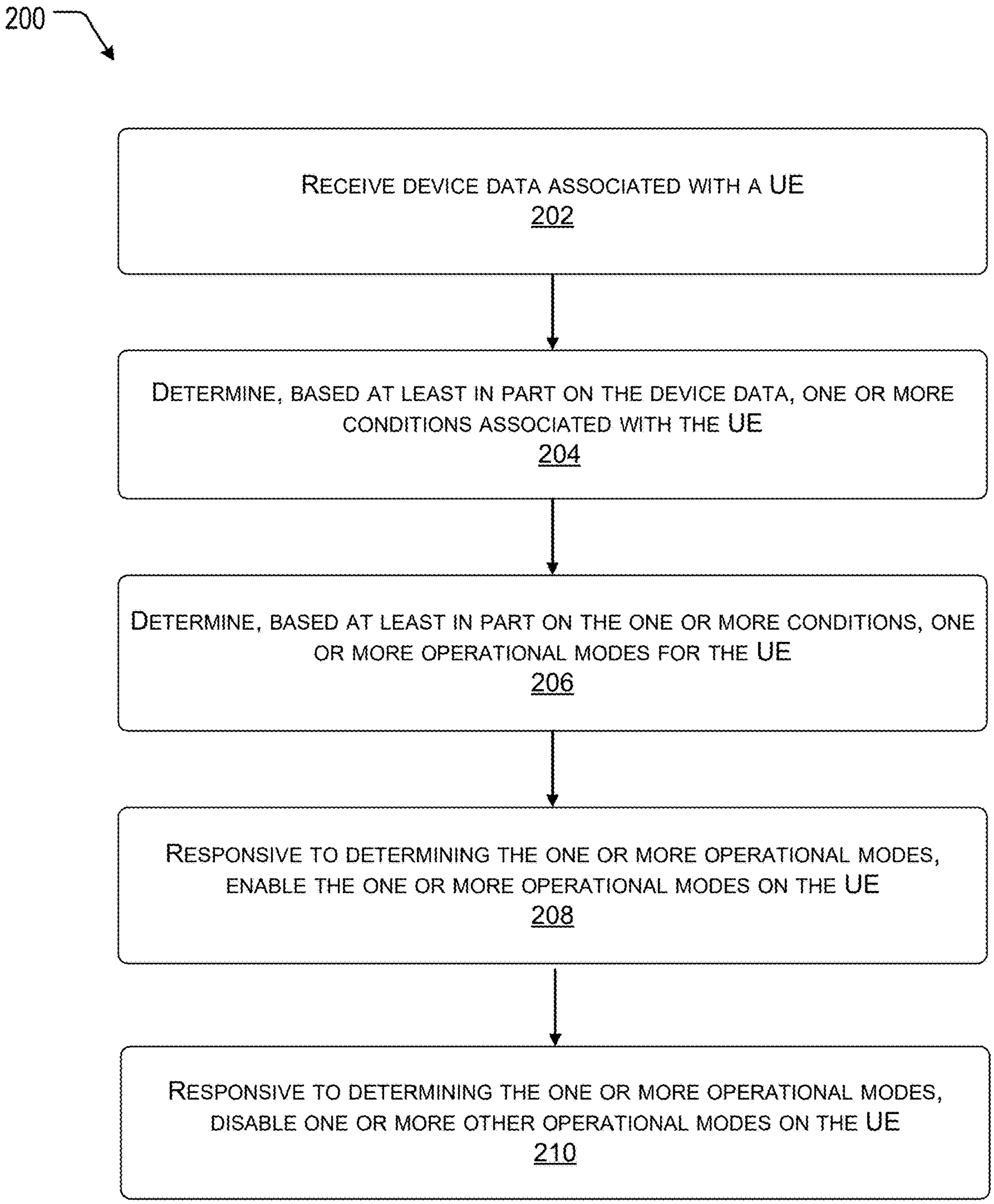
FIG. 2 is a flow diagram illustrating an example process associated with enabling and disabling operational modes on a UE on behalf of a user according to some implementations.
Figure 3:
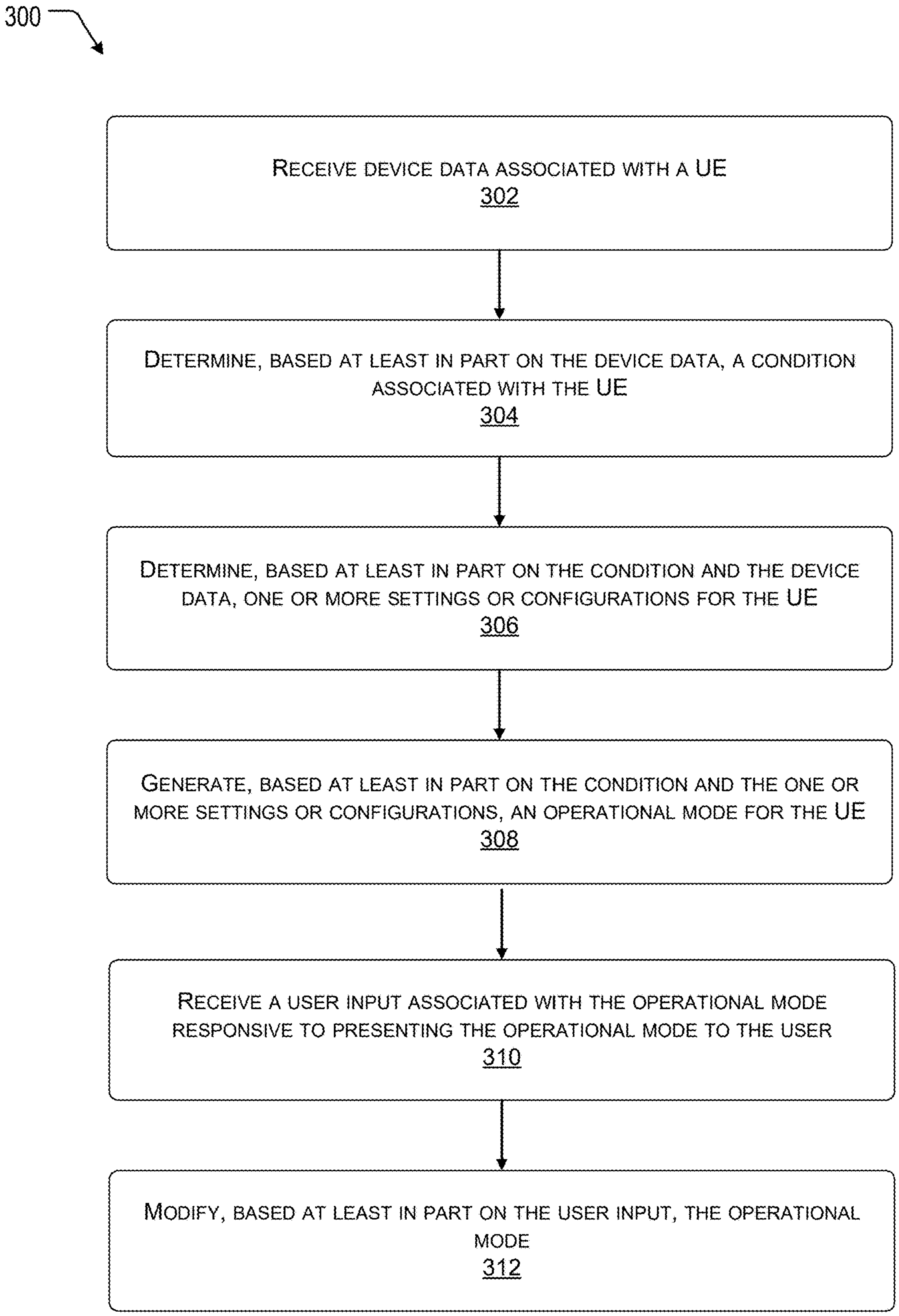
FIG. 3 is a flow diagram illustrating an example process associated with generating operational modes for a UE on behalf of a user according to some implementations.
Figure 4:
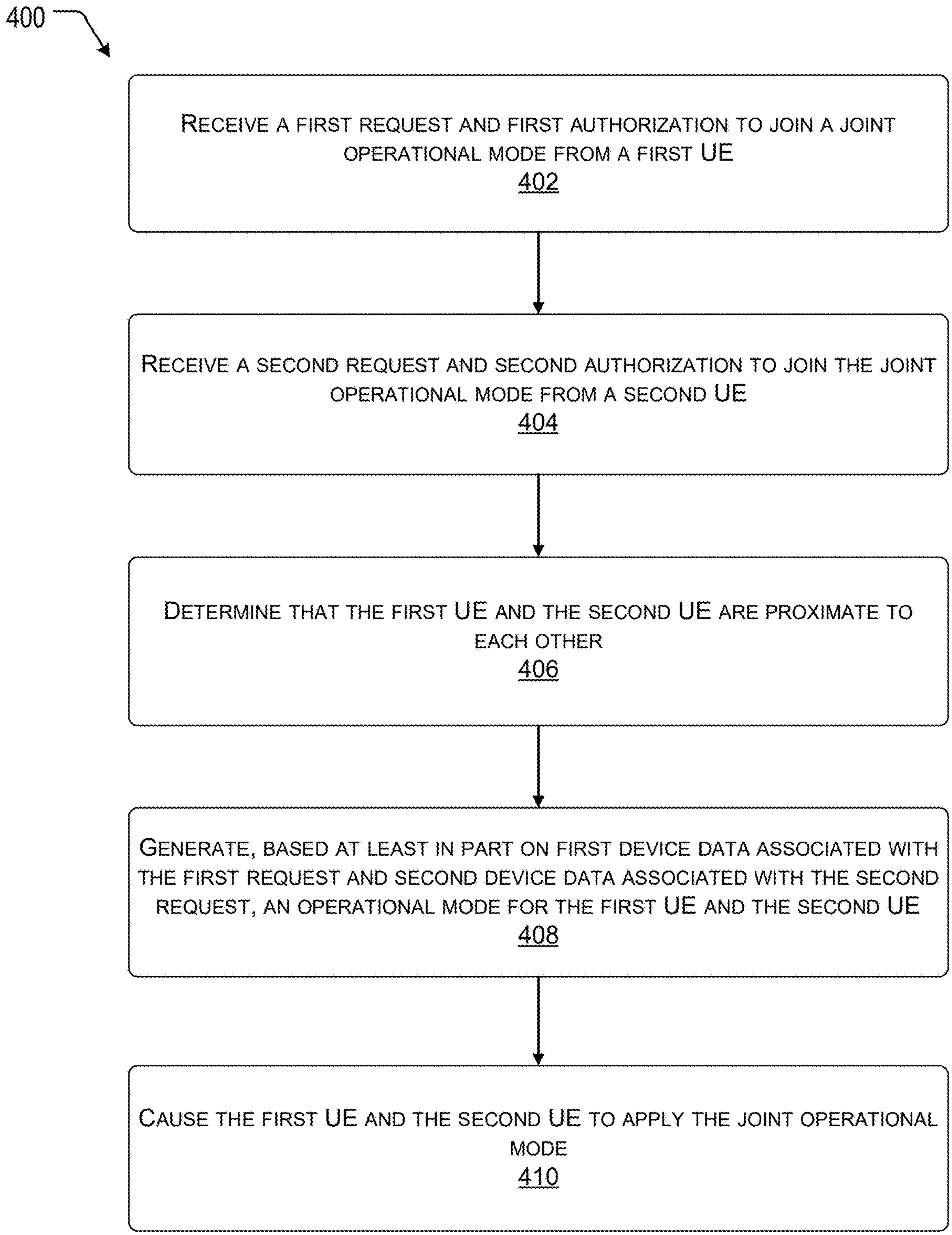
FIG. 4 is a flow diagram illustrating an example process associated with generating joint operational modes for a group of UEs on behalf of their users according to some implementations.

FIGS. 2-4 are flow diagrams illustrating example processes associated with the system discussed herein. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processor(s), perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 2 is a flow diagram illustrating an example process 200 associated with enabling and disabling operational modes on a UE on behalf of a user according to some implementations. As discussed herein, operational modes for a UE may be enabled and disabled on the UE on behalf of the user based at least in part on device data associated with current conditions of the device, the user, and the environment surrounding the UE. In various examples, the active operational mode may be selected by a dynamic regulator agent executing on the UE and/or by a dynamic regulator manager operating in the cloud (such as part of the wireless communication network associated with the UE) and in communication with the UE.

At 202, the dynamic regulator agent and/or the dynamic regulator manager may receive device data associated with a UE. For example, the device data may include environmental data associated with a physical environment surrounding the user and the device (e.g., location, temperature, other proximate or connected UE, and the like), user interactions with the device, historical data (such as user behavioral data, user preferences, and the like), network data (e.g., available networks, connectivity, bandwidth, and the like), and the like. In some cases, the device data may be received via one or more sensors of the UE, a user interface of the UE, a device proximate to the UE and in communication with the UE, and the like.

At 204, the dynamic regulator agent and/or the dynamic regulator manager may determine, based at least in part on the device data, one or more conditions associated with the UE. For example, individual operational modes may be generated with activation or enabling conditions or criteria that when met or exceeded, the dynamic regulator agent and/or the dynamic regulator manager may enable the operational mode on the UE. In some cases, the dynamic regulator agent and/or the dynamic regulator manager may utilize one or more machine learning models to determine the one or more conditions. For example, the dynamic regulator agent and/or the dynamic regulator manager may input the device data the one or more machine learning models and receive the one or more conditions (e.g., the current conditions) associated with the UE as an output.

At 206, the dynamic regulator agent and/or the dynamic regulator manager may determine, based at least in part on the one or more conditions, one or more operational modes for the UE. For example, the dynamic regulator agent and/or the dynamic regulator manager may select between available operational modes based at least in part on the one or more conditions. For instance, the UE may have multiple operational modes for a similar conditions, such as multiple low power modes, that maybe triggered as the power stored in the battery falls below individual thresholds with additional criteria for each of the modes (e.g., location data, last recharge data, such as last recharge time, recharge frequency over a preceding period of time, last recharge amount, and the like, active application data, usage data over a preceding period of time, or the like).

As an illustrative example, the dynamic regulator agent and/or the dynamic regulator manager may select between a first low power mode and a second low power mode when the stored battery power falls to or below a threshold power level. For instance, the dynamic regulator agent and/or the dynamic regulator manager may select the first low power mode when the recent UE activity is low (e.g., below or equal to an activity threshold) and the second low power mode when the recent UE activity is high (e.g., above the activity threshold).

At 208, the dynamic regulator agent and/or the dynamic regulator manager may, responsive to determining the one or more operational modes, enable the one or more operational modes on the UE. For example, once an operational mode is selected, such as via the output of the one or more machine learning models, the dynamic regulator agent and/or the dynamic regulator manager may cause the operational model to be enabled on the UE.

At 210, the dynamic regulator agent and/or the dynamic regulator manager may, responsive to determining the one or more operational modes, disable one or more other operational modes on the UE. For example, once the operational mode is selected, such as via the output of the one or more machine learning models, the dynamic regulator agent and/or the dynamic regulator manager may cause a current operational model to be disabled on the UE, such as in conjunction with the selected operational mode being enabled.

FIG. 3 is a flow diagram illustrating an example process 300 associated with generating operational modes for a UE on behalf of a user according to some implementations. As discussed herein, operational modes for a UE may be generated and/or modified on behalf of the user based at least in part on device data associated with the device, the user, and the environment surrounding the UE, over time. In various examples, the operational modes may be generated by a dynamic regulator agent executing on the UE and/or by a dynamic regulator manager operating in the cloud (such as part of the wireless communication network associated with the UE) and in communication with the UE.

At 302, the dynamic regulator agent and/or the dynamic regulator manager may receive device data associated with a UE. In some cases, the device data may be over one or more periods of time (such as intervals of use or the like). For example, the device data may include environmental data associated with a physical environment surrounding the user and the device (e.g., location, temperature, other proximate or connected UE, and the like), user interactions with the device, historical data (such as user behavioral data, user preferences, and the like), network data (e.g., available networks, connectivity, bandwidth, and the like), and the like. In some cases, the device data may be received via one or more sensors of the UE, a user interface of the UE, a device proximate to the UE and in communication with the UE, and the like.

In some specific examples, such as when the cloud-based dynamic regulator manager generates the operational mode, the dynamic regulator manager may receive third-party device data associated with other UEs and other users. In some cases, the third-party device data may be selected based on detected correspondences and/or similarities between the user of the UE and the other users of the other UEs as well as detected correspondences and/or similarities between the activity/operations of the UE and the activity/operations of the other UEs.

At 304, the dynamic regulator agent and/or the dynamic regulator manager may determine, based at least in part on the device data, a condition associated with the UE. For example, individual operational modes may be generated with activation or enabling conditions or criteria that when met or exceeded, the dynamic regulator agent and/or the dynamic regulator manager may enable the operational mode on the UE. In some cases, the dynamic regulator agent and/or the dynamic regulator manager may utilize one or more machine learning models to determine the one or more conditions. For example, the dynamic regulator agent and/or the dynamic regulator manager may input the device data into the one or more machine learning models and receive the one or more conditions (e.g., the current conditions) associated with the UE as an output.

At 306, the dynamic regulator agent and/or the dynamic regulator manager may determine, based at least in part on the condition and the device data, one or more settings or configurations for the UE. For example, the dynamic regulator agent and/or the dynamic regulator manager may utilize one or more machine learning models to generate settings and/or configurations for use in one or more operational modes customized for the user and the UE based on the conditions and associated device data, as well as historical device data collected over time and interactions between the user and applications hosted on the device and/or former or other UEs. The one or more machine learning models may be trained on user interaction data as well as other device data, such as environmental data, a combination thereof as well as other data.

At 308, the dynamic regulator agent and/or the dynamic regulator manager may generate, based at least in part on the condition and the one or more settings or configurations, an operational mode for the UE. In some cases, the dynamic regulator agent and/or the dynamic regulator manager may utilize additional machine learning models that receive the one or more settings and/or configurations as inputs. In other cases, the dynamic regulator agent and/or the dynamic regulator manager may utilize the same machine learning models used to generate the one or more settings and/or configurations, such as via a neural network that is trained end to end to receive the device data and output the operational mode.

At 310, the dynamic regulator agent and/or the dynamic regulator manager may receive a user input associated with the operational mode responsive to presenting the operational mode to the user and, at 312, modify, based at least in part on the user input, the operational mode. For example, the user may utilize a user interface of the UE to adjust or modify a condition (such as an activation condition), setting, or the like associated with the newly generated operational mode. As one illustrative example, the user may adjust a screen brightness setting when the operational mode is a low power mode.

FIG. 4 is a flow diagram illustrating an example process 400 associated with generating joint operational modes for a group of UEs on behalf of their users according to some implementations. In some cases, the cloud-based dynamic regulator manager may be configured to generate and apply joint operational modes between proximate UEs or devices that are within a range of various types of device-to-device wireless communication. In these cases, the cloud-based dynamic regulator manager may receive a request and authorization to apply a joint operational mode to a group of UEs from each of the UEs/user of the UEs associated with the group.

At 402, the dynamic regulator manager may receive a first request and first authorization to join a joint operational mode from a first UE and, at 404, receive a second request and second authorization to join the joint operational mode from a second UE. In some cases, the first request and the second request may be received concurrently to each other. In other cases, the first request may be received at a first time and the second request may be received at a second time subsequent to the first time, but during a period of time in which the conditions associated with the first UE have not changed by more than a threshold amount or within a period of time indicated by the first request that the first UE desires to be functioning as part of a joint operational mode with shared device responsibility, assignments, tasks, and the like.

In some implementations, the first request and the second request may include device data associated with conditions of the corresponding UE, the environment surrounding the corresponding UE, conditions associated with the user, predicted future conditions of the UE and/or the user, and the like. In these cases, the dynamic regulator manager may utilize the first device data and the second device data to determine conditions and settings for the joint operational mode. In some cases, the device data may include location data and connectivity data, such as to indicate that the first UE detects the second UE via a short range wireless communication protocol or vice versa.

The first authorization and the second authorization may include permissions for the dynamic regulator manager to make changes on the first UE and the second UE, as well as for the first UE and the second UE to share data between each other via a device-to-device communication protocol. In some cases, the dynamic regulator manager may provide data associated with the first UE and first user to the second UE and second use and data associated with the second UE and the second user to the first UE and the first user prior to receiving the corresponding authorization.

At 406, the dynamic regulator manager may determine that the first UE and the second UE are proximate to each other. For example, the dynamic regulator mange may utilize the location data to determine the two UEs are within a geographical distance or threshold from each other. The dynamic regulator manager may utilize the connectivity data to determine the two UEs are within range of each other for a desired communication protocol or the like. In this manner, the dynamic regulator manager may determine if the first UE and second UE are within a proximity that the two UEs may share data between each other.

At 408, the dynamic regulator manager may generate, based at least in part on first device data associated with the first request and second device data associated with the second request, an operational mode for the first UE and the second UE. For example, the dynamic regulator manager may generate an operational mode in which the first UE and the second UE share responsibilities for various device activities (e.g., clock updates, network updates, location data collection, and the like).

In some examples, the dynamic regulator manager may utilize one or more machine learning models to generate the joint operational mode for the first UE and second UE. For example, the dynamic regulator manager may input the first device data and the second device data, as well as any user request data (e.g., period of time for the mode to remain operational, user requested settings, user indicated charging availability for the period of time, and the like), into the one or more machine learning models. The one or more machine learning models may then output a joint operational mode customized for the first UE and second UE, such as customized based on the capabilities, configurations, and current status of the first UE and second UE. For instance, the joint operational mode may apply more tasks to the first UE when the first UE has a larger power supply and a larger remaining battery life than the second UE or the like. In some cases, the one or more machine learning models may be trained using device data of various UEs over time and in various conditions. The training data may also include UEs having various configurations or capabilities operating in conjunction with each other. In some specific cases, the training data may include specific operational conditions and goals (e.g., target achievement-such as all UEs reaming active for a given period of time with limited or no device charging available).

At 410, the dynamic regulator manager may cause the first UE and the second UE to apply the joint operational mode. For example, the dynamic regulator manager may send the joint operational mode to each of the first UE and second UE with instructions to cause the first UE and second UE to apply the one or more settings associated with the joint operational mode as well as instructions to share data between the first UE and second UE. In some cases, the dynamic regulator manager may also cause an alert to be displayed or presented to the first user of the first UE and the second user of the second UE. In some cases, the alert may include the tasks assigned to each UE, an estimated benefit to the joint operational mode for each UE (e.g., an increased battery life of seven hours for the first UE or the like), and the like. In some cases, the alert may include an option to opt out of the joint operational mode if the user desires.

In the current example, a first UE and second UE are discussed joining a joint operational mode. However, it should be understood that any number of two or more UEs may be associated with a single joint operational mode or two or more joint operational modes.

Figure 5:
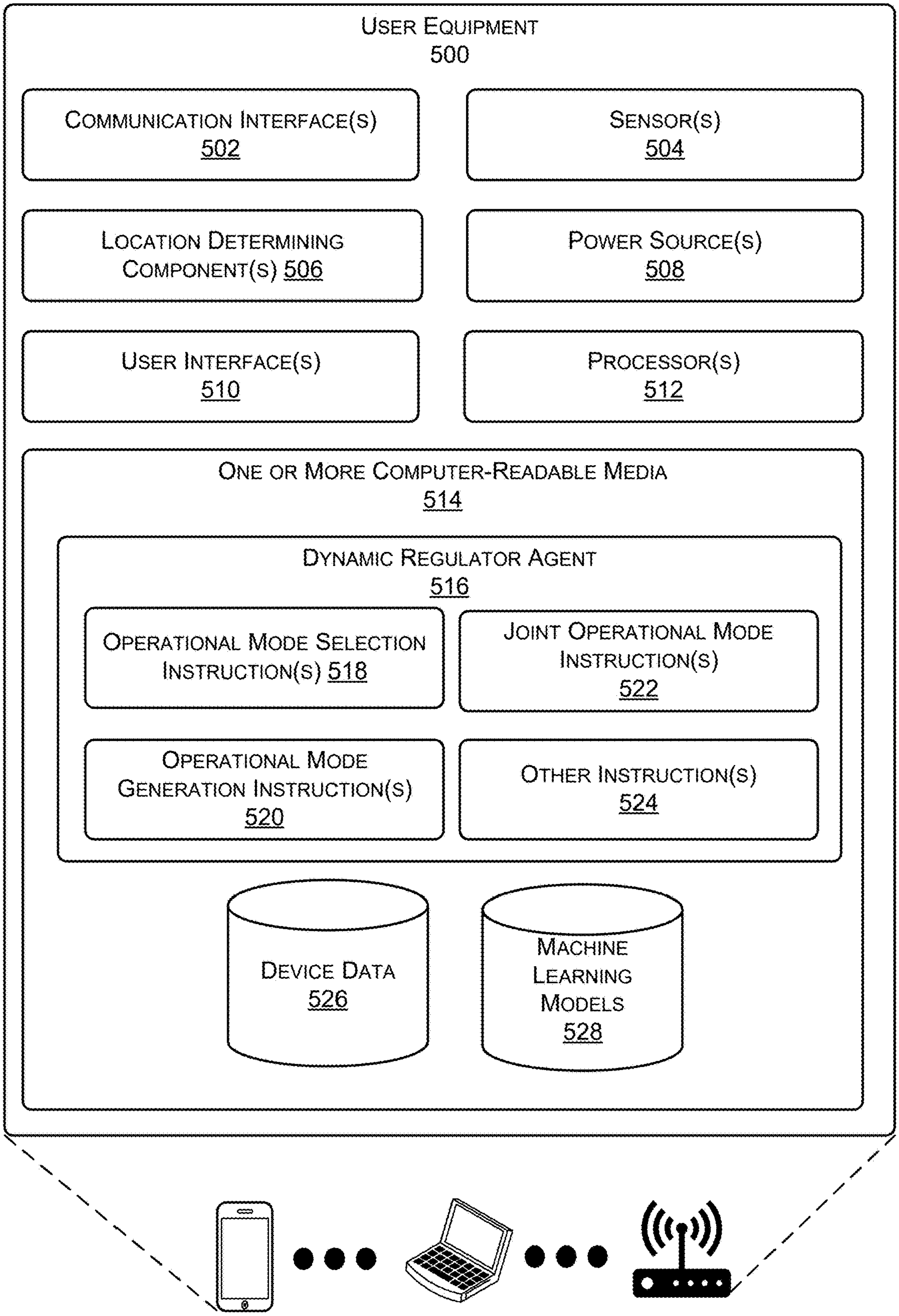
FIG. 5 is an example UE that may implement the dynamic regulator agent according to some implementations.

FIG. 5 is an example UE 500 that may implement the dynamic regulator agent according to some implementations. For example, the UE 500 may be an end user device, such as a smart phone, tablet, computer, router, wearable (e.g., smart watch, smart ring, and the like), or other user device that may connect to a communication network.

In some implementations, the UE 500 may include one or more communication interface(s) 502 that enables communication between the UE 500 and one or more other local or remote computing device(s) or remote services, such as the dynamic regulator manager of FIGS. 1-4 and/or other proximate UEs, as discussed herein. For instance, the communication interface(s) 502 can facilitate communication with other proximity sensor systems, a central control system, or other facility systems. The communications interfaces(s) 502 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

The UE 500 also includes one or more sensor(s) 504 may be configured to capture the sensor data associated with assets. In at least some examples, the sensor(s) 504 may include thermal sensors, LIDAR sensors, image devices or cameras (e.g., RGB, IR, intensity, depth, etc.), accelerometers, gyroscopes, manometers, microphones, biometric sensors, environmental sensors (e.g., temperature sensors, humidity sensors, light sensors, pressure sensors, etc.), and the like. In some examples, the sensor(s) 504 may include multiple instances of each type of sensor. For instance, camera sensors may include multiple cameras disposed at various locations.

The UE 500 may also include one or more location determining component(s) 506 for determining a global position of the UE, such as for use in navigation. The location determining component(s) 506 may include one or more sensor package combination(s) including Global Navigation Satellite System (GNSS) sensors and receivers, Global Positioning System (GPS) sensors and receivers, or other satellite systems. For example, the location determining component(s) 506 may be configured to decode satellite signals in various formats or standards, such as GPS, GLONASS, Galileo or BeiDou.

The UE 500 may also include one or more power sources 508 to store and provide power to the various other systems of the UE 500 as well as one or more user interfaces 510. The user interfaces 510 may be configured to provide information to the user, such as a display, and/or receive user inputs from the user, such as a touch enabled display.

The UE 500 may include one or more processor(s) 512 and one or more computer-readable media 514. Each of the processors 512 may itself comprise one or more processor(s) or processing core(s). The computer-readable media 514 is illustrated as including memory/storage. The computer-readable media 514 may include volatile media (such as random access memory (RAM)) and/or nonvolatile media (such as read only memory (ROM), Flash memory, optical disks, magnetic disks, and so forth). The computer-readable media 514 may include fixed media (e.g., GPU, NPU, RAM, ROM, a fixed hard drive, and so on) as well as removable media (e.g., Flash memory, a removable hard drive, an optical disc, and so forth). The computer-readable media 514 may be configured in a variety of other ways as further described below.

Several modules such as instructions, data stores, and so forth may be stored within the computer-readable media 514 and configured to execute on the processors 512. For example, as illustrated, the computer-readable media 514 stores a dynamic regulator agent 516. The dynamic regulator agent 516 may include operational mode selection instructions 518, operational mode generation instructions 520, joint operational mode instructions 522 as well as other instructions 524, such as alert generation instructions and the like. The computer-readable media 514 may also be configured to store data, such as device data 526 and machine learned models 528, as well as other data.

The operational mode selection instructions 518 may be configured to utilize device data 526 and/or the one or more machine learning models 528 to select operational modes (such as user approved operational modes) on behalf of a user of the UE 500 based on the current device data 526 representing the current conditions of the UE 500.

The operational mode generation instructions 520 may be configured to utilize device data 526 and/or the one or more machine learning models 528 to generate customized operational modes on behalf of a user of the UE 500 based on the device data 526 (e.g., current and over time) to assist the user in improving the performance of the UE 500.

The joint operational mode instructions 522 may be configured to interface and communicate with a cloud-based dynamic regulator manager to assist the UE 500 in engaging in a joint operational mode with one or more other UEs in proximity to the UE 500, as discussed herein.

Figure 6:
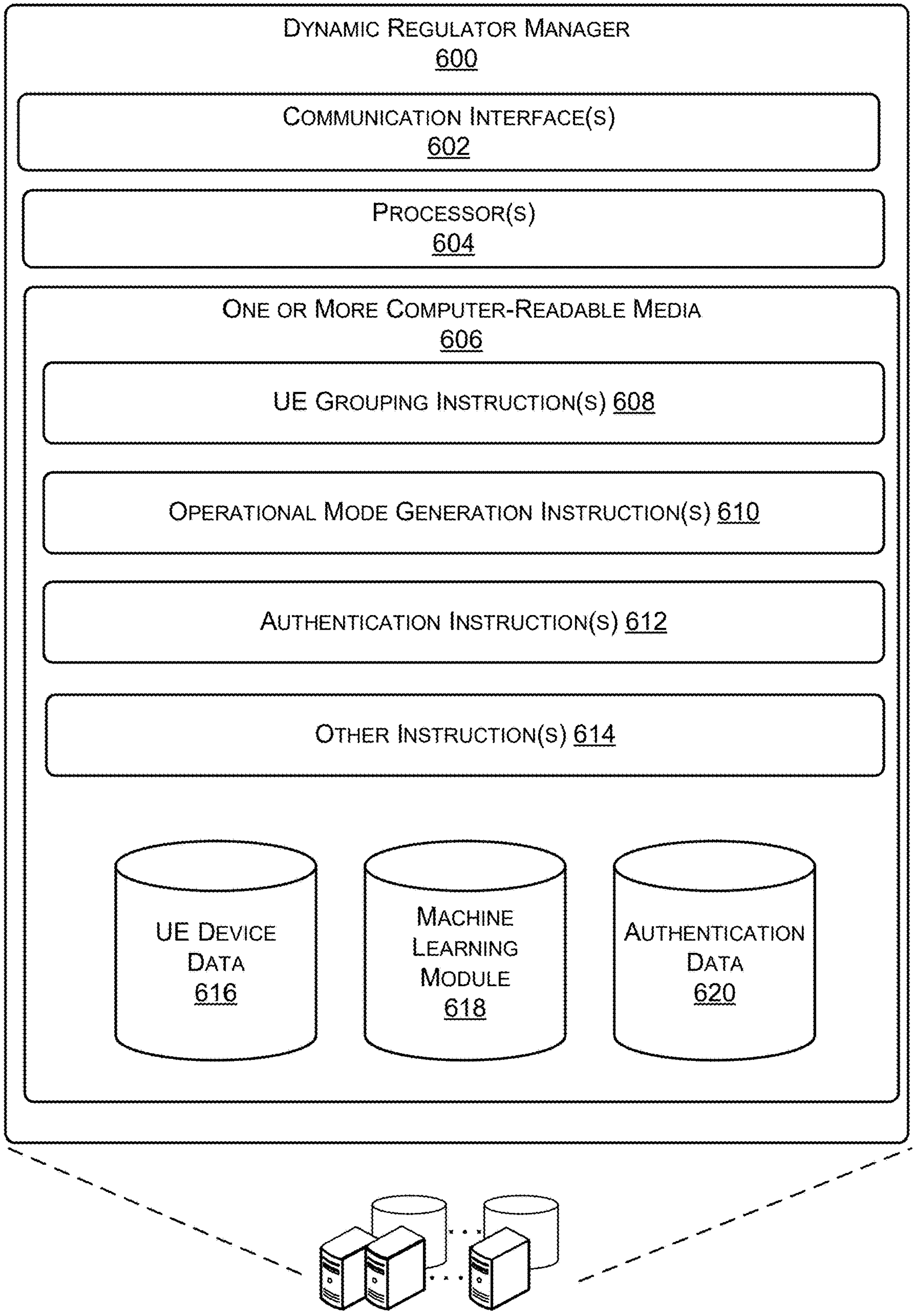
FIG. 6 is an example cloud-based dynamic regulator manager that may implement the techniques described herein according to some implementations.

FIG. 6 is an example cloud-based dynamic regulator manager 600 that may implement the techniques described herein according to some implementations. The dynamic regulator manager 600 may include one or more communication interface(s) 602 (also referred to as communication devices and/or modems), one or more processor(s) 604, and one or more computer readable media 606.

The dynamic regulator manager 600 may include one or more communication interfaces(s) 602 that enable communication between the dynamic regulator manager 600 and one or more other local or remote computing device(s) or remote services, such as a UE as illustrated with respect to FIG. 1. For instance, the communication interface(s) 602 can facilitate communication with other central processing systems, a user device, or other third-party systems to receive and provide diagrams in various formats. The communications interfaces(s) 602 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

The dynamic regulator manager 600 may include one or more processors 604 and one or more computer-readable media 606. Each of the processors 604 may itself comprise one or more processors or processing cores. The computer-readable media 606 is illustrated as including memory/storage. The computer-readable media 606 may include volatile media (such as random access memory (RAM)) and/or nonvolatile media (such as read only memory (ROM), Flash memory, optical disks, magnetic disks, and so forth). The computer-readable media 606 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Several modules such as instructions, data stores, and so forth may be stored within the computer-readable media 606 and configured to execute on the processors 604. For example, as illustrated, the computer-readable media 606 stores UE grouping instructions 608, operational mode generation instructions 610, authentication instructions 612, as well as other instructions 614, such as an operating system. The computer-readable media 606 may also be configured to store data, such as UE device data 616, one or more machine learning models 618, authentication data 620, as well as other data.

The UE grouping instructions 608 may be configured to group UEs for implementing joint operational modes, as discussed herein. For example, the UE grouping instructions 608 may group UEs based on geographical distance, connectivity between UEs, similar device capability requests, and the like. In some cases, the UE grouping instructions 608 may utilize the authentication data 620 to generate the group.

The operational mode generation instructions 610 may be configured to utilize UE device data 616 and/or the one or more machine learning models 618 to generate customized operational modes on behalf of the group of UEs.

The authentication instructions 612 may be configured to authenticate each UE with other UEs for the sharing of data as well as for the groping of UEs for use of joint operational modes.

Although the discussion above sets forth example implementations of the described techniques, other architectures may be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:

determining, based at least in part on first device data associated with a first user equipment, a current condition associated with the first user equipment;

determining, based at least in part on a change in the current condition compared to a prior condition, that a change in a joint operational mode to be implemented, the joint operational mode executed in conjunction with a second user equipment;

responsive to determining the change in the joint operational mode to be implemented, determining, based at least in part on the first device data and second device data associated with the second user equipment, the joint operational mode to apply to the first user equipment; and causing the first user equipment to operate according to the joint operational mode;

wherein the joint operational mode is generated by:

inputting the first device data and the second device data into one or more machine learning models, the one or more machine learning models trained to generate dynamic joint operational modes based at least in part on device data of two or more user equipment using device data of various type of user equipment operating over various periods of time, and receiving, as an output of the one or more machine learning models, the joint operational mode.

2. The method of claim 1, wherein the one or more machine learning models are further trained to select operational modes from a set of available operational modes using device data of various type of user equipment operating over various periods of time.

3. The method of claim 1, wherein the first device data includes:

network data associated with one or more conditions associated with a communications network communicatively coupled to the first user equipment;

sensor data generated by one or more sensors of the first user equipment;

conditions associated with a user of the first user equipment or the first user equipment; or application data associated with one or more applications operating on the first user equipment.

4. The method of claim 1, wherein:

the joint operational mode includes at least one operation to be performed by the first user equipment and at least one second operation to be performed by the second user equipment.

5. The method of claim 4, wherein while the first user equipment and the second user equipment are operating under the joint operational mode, the first user equipment and the second user equipment are operating on a schedule to be in direct communication when indicated by the schedule.

6. The method of claim 1, wherein generating the joint operational mode further comprises:

responsive to determining that the first user equipment is within a threshold physical distance or connectivity distance of the second user equipment, grouping the first user equipment and the second user equipment into a set of user equipment.

7. The method of claim 6, wherein the set of user equipment includes at least a third user equipment, the third user equipment within the threshold physical distance or connectivity distance of either the first user equipment or the second user equipment.

8. One or more non-transitory computer-readable media storing instructions that, when executed by one or more processors, cause the one or more processors to perform operations comprising:

receiving a first request from a first user equipment to participate in a joint operational mode, the first request including first device data associated with the first user equipment;

receiving a second request from a second user equipment to participate in the joint operational mode, the second request including second device data associated with the second user equipment;

determining that the first user equipment would benefit from participating in the joint operational mode with the second user equipment and that the second user equipment would benefit from participating in the joint operational mode with the first user equipment;

determining, based at least in part on the first device data and the second device data, at least one setting or configuration for the first user equipment and at least one setting or configuration for the second user equipment to implement while participating in the joint operational mode;

sending the at least one setting or configuration for the first user equipment to the first user equipment; and sending the at least one setting or configuration for the second user equipment to the second user equipment, wherein the joint operational mode is generated by:

inputting the first device data and the second device data into one or more machine learning models, the one or more machine learning models trained to generate dynamic joint operational modes based at least in part on the device data of two or more user equipment using device data of various type of user equipment operating over various periods of time, and receiving, as an output of the one or more machine learning models, the joint operational mode.

9. The one or more non-transitory computer-readable media of claim 8, wherein the second request is received within a period of time of the first request.

10. The one or more non-transitory computer-readable media of claim 8, wherein the operations further comprise:

receiving first authentication data associated with the first user equipment, the first authentication data to allow the second user equipment to establish direct communication with the first user equipment; and receiving second authentication data associated with the second user equipment, the second authentication data to allow the first user equipment to establish direct communication with the second user equipment.

11. The one or more non-transitory computer-readable media of claim 8, wherein sending the at least one setting or configuration for the first user equipment differs from the at least one setting or configuration for the second user equipment to the second user equipment.

12. The one or more non-transitory computer-readable media of claim 11, wherein the at least one setting or configuration for the first user equipment includes settings or configuration to communicate with a communication network and the at least one setting or configuration for the second user equipment includes disabling at least one communication interfaces of the second user equipment.

13. The one or more non-transitory computer-readable media of claim 8, wherein the one or more machine learning models are further trained to select operational modes from a set of available operational modes using device data of various type of user equipment operating over various periods of time.

14. A system comprising:

one or more processors;

one or more communication interfaces; and one or more computer-readable media storing instructions that, when executed by the one or more processors, cause the one or more processors to perform operations comprising:

determining a change in a current condition of a first user equipment compared to a prior condition of the first user equipment;

based at least in part of the change in the current condition, determining that a change in a joint operation mode to be implemented, the joint operation mode sharing operational tasks with a third party device;

inputting first device data associated with the first user equipment and second device data associated with the third party device into one or more machine learning models, the one or more machine learning models trained to generate dynamic joint operational modes based at least in part on the first device data using data of various type of user equipment operating over various periods of time; and receiving, as an output of the one or more machine learning models, a joint operational mode for the first user equipment; and causing the first user equipment to operate according to the joint operational mode.

15. The system of claim 14, wherein determining the change in the current condition of the first user equipment compared to the prior condition of the first user equipment further comprises detecting a transition in a physical location of the first user equipment.

16. The system of claim 14, wherein determining the change in the current condition of the first user equipment compared to the prior condition of the first user equipment further comprises detecting a transition from a terrestrial network to a satellite network.

17. The system of claim 14, wherein the joint operational mode includes sharing operational tasks with at least one other third party device.

18. The system of claim 14, wherein the first device data includes:

behavioral data or trends determined by the first user equipment over time and associated with a user of the first user equipment;

hardware data associated with components of the first user equipment; or conditions associated with an environment surrounding the first user equipment.

19. The system of claim 14, wherein the one or more machine learning models are further trained to select operational modes from a set of available operational modes using device data of various type of user equipment operating over various periods of time.

20. The system of claim 14, wherein the joint operational mode includes at least one operation to be performed by the first user equipment and at least one second operation to be performed by the third-party device.

* * * * *